United States Patent [19]
Webb et al.

[11] Patent Number: 5,351,997
[45] Date of Patent: Oct. 4, 1994

[54] PIPE COUPLING

[75] Inventors: Ian R. Webb, Gerrards Cross; William Taylor, Pinner; Neil J. T. Taylor, Rickmansworth, all of United Kingdom

[73] Assignee: Taylor Kerr (Couplings) Ltd., London, United Kingdom

[21] Appl. No.: 988,114

[22] PCT Filed: Jul. 23, 1991

[86] PCT No.: PCT/GB91/01232

§ 371 Date: Jan. 26, 1993

§ 102(e) Date: Jan. 26, 1993

[87] PCT Pub. No.: WO92/02752

PCT Pub. Date: Feb. 20, 1992

[30] Foreign Application Priority Data

Jul. 27, 1990 [GB] United Kingdom ............... 9016489.8
Jan. 25, 1991 [GB] United Kingdom ............... 9101641.0

[51] Int. Cl.$^5$ ............................................. F16L 17/00
[52] U.S. Cl. ...................................... 285/105; 285/373
[58] Field of Search ................ 285/104, 105, 112, 340, 285/373, 369

[56] References Cited

U.S. PATENT DOCUMENTS

| | | | |
|---|---|---|---|
| 2,201,372 | 5/1940 | Miller | 285/340 X |
| 3,565,468 | 2/1971 | Garrett . | |
| 3,801,141 | 4/1974 | Hollingsworth | 285/373 X |
| 3,877,733 | 4/1975 | Straub . | |
| 4,119,333 | 10/1978 | Straub . | |
| 4,518,177 | 5/1985 | Deakins | 285/373 X |
| 4,627,645 | 12/1986 | Sauer | 285/373 X |

FOREIGN PATENT DOCUMENTS

| | | |
|---|---|---|
| 0180824 | 5/1986 | European Pat. Off. . |
| 3301229 | 7/1984 | Fed. Rep. of Germany . |
| 3421605 | 12/1985 | Fed. Rep. of Germany . |
| 3445807 | 6/1986 | Fed. Rep. of Germany . |
| 2359354 | 2/1978 | France . |
| 2359355 | 2/1978 | France . |
| 135474 | 7/1963 | New Zealand . |
| 166564 | 3/1973 | New Zealand . |
| 183015 | 1/1977 | New Zealand . |
| 218779 | 12/1986 | New Zealand . |
| 207900 | 10/1966 | Sweden ........................... 285/112 |
| 995409 | 6/1965 | United Kingdom . |
| 1214847 | 12/1970 | United Kingdom . |
| 1582858 | 1/1981 | United Kingdom . |
| 1582859 | 1/1981 | United Kingdom . |
| 2167145 | 5/1986 | United Kingdom . |
| 2186651 | 8/1987 | United Kingdom . |
| 2227068 | 7/1990 | United Kingdom . |

*Primary Examiner*—Dave W. Arola
*Attorney, Agent, or Firm*—Flynn, Thiel, Boutell & Tanis

[57] ABSTRACT

A pipe coupling for connecting together two plain-ended pipes in a fluid-tight manner comprises an outer tubular casing, an inner tubular casing and a tubular sealing sleeve. The sealing sleeve has two sets of inwardly projecting ribs which, in use, are pressed into sealing engagement with the respective ends of the pipes. The inner and outer casings are longitudinally split and tensioning screws on the outer casing can be tightened to tighten the outer casing around the inner casing and the sealing sleeve. Frustoconical slots in the outer surfaces of the sealing sleeves receive frustoconical gripping rings which have gripping teeth on the inner sides which bite into the pipe surfaces to secure the pipes against axial displacement.

19 Claims, 3 Drawing Sheets

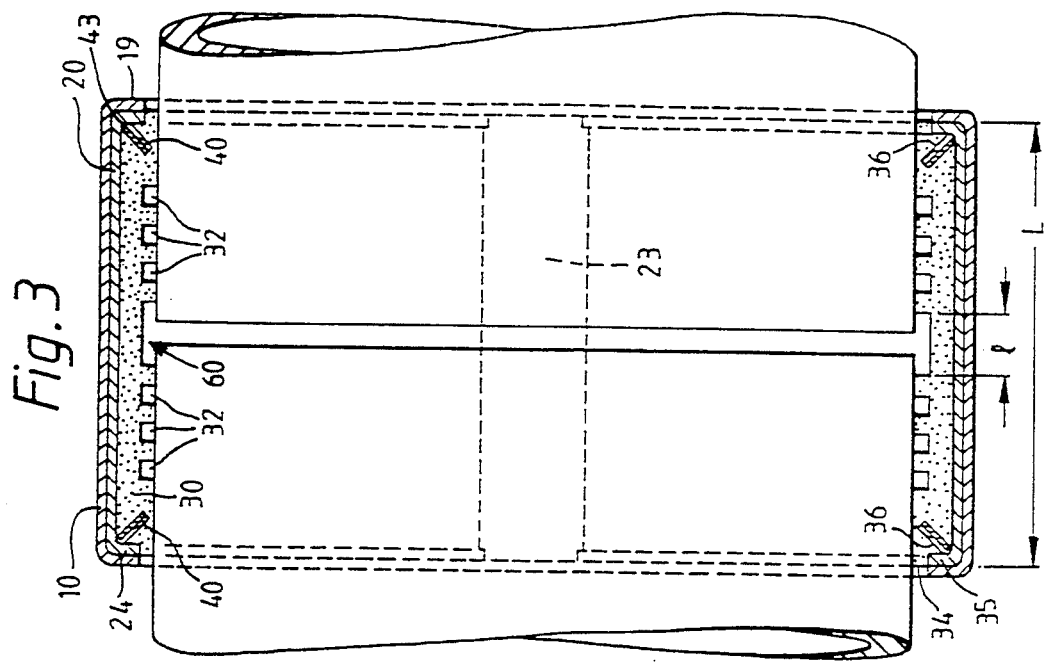
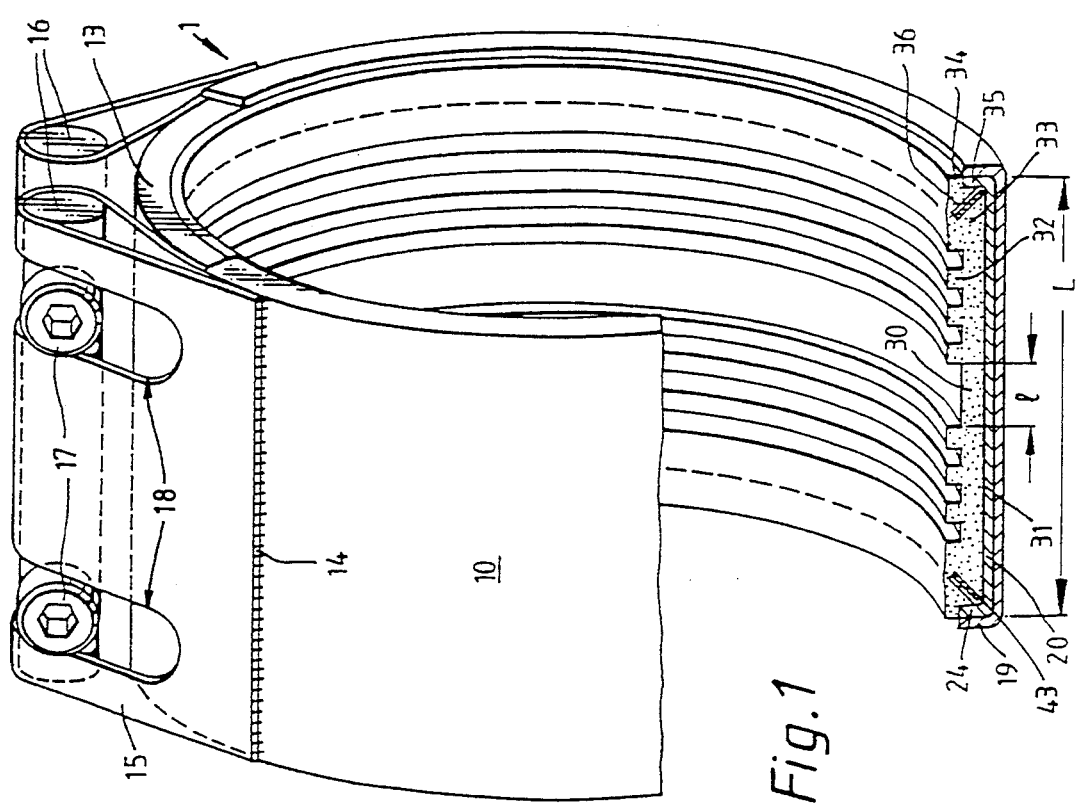

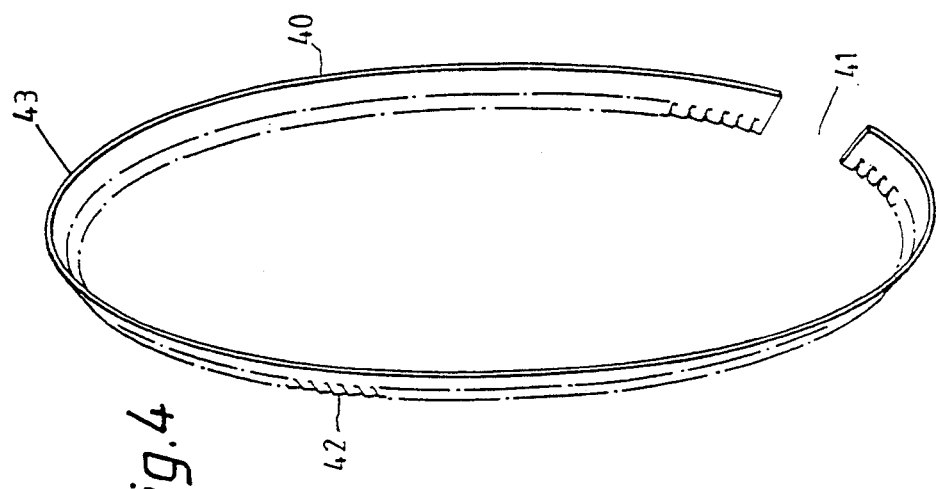
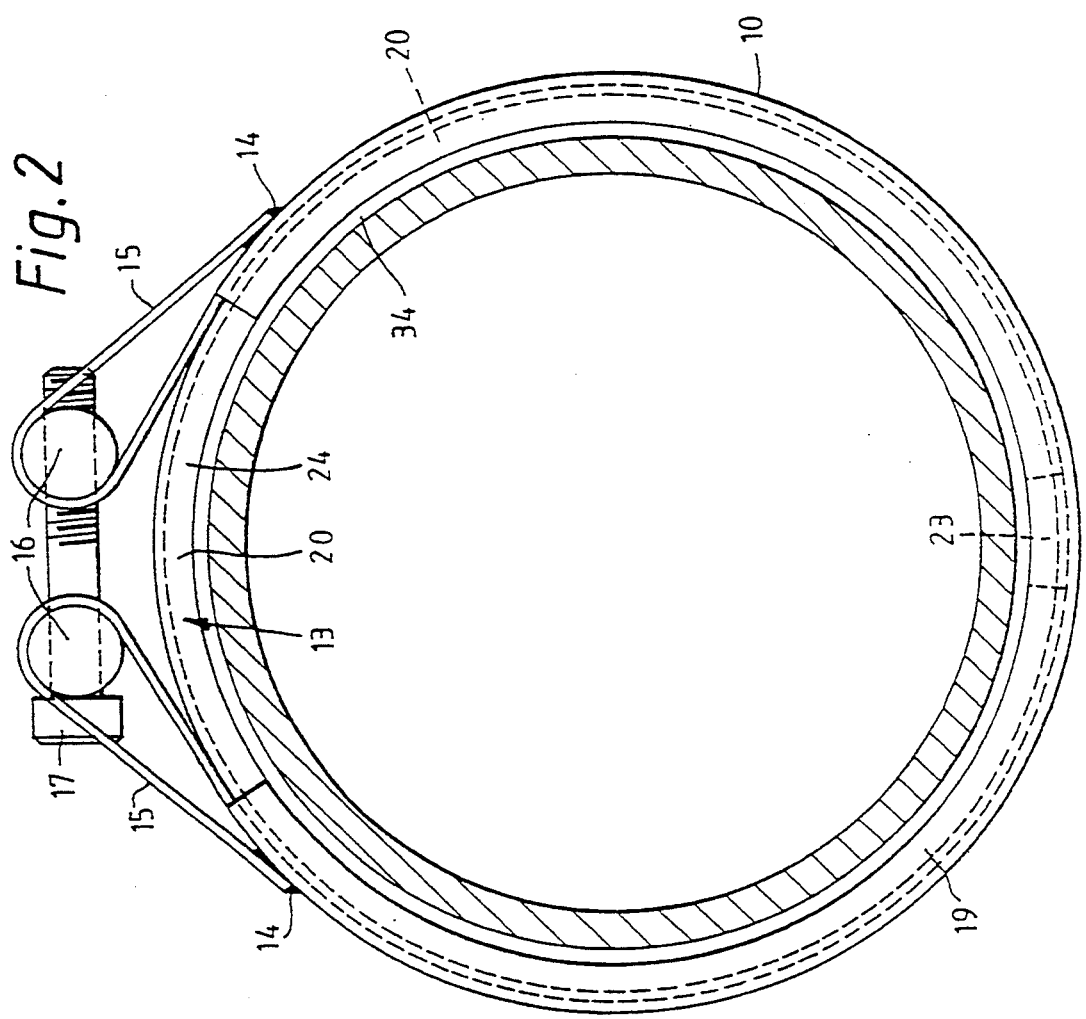

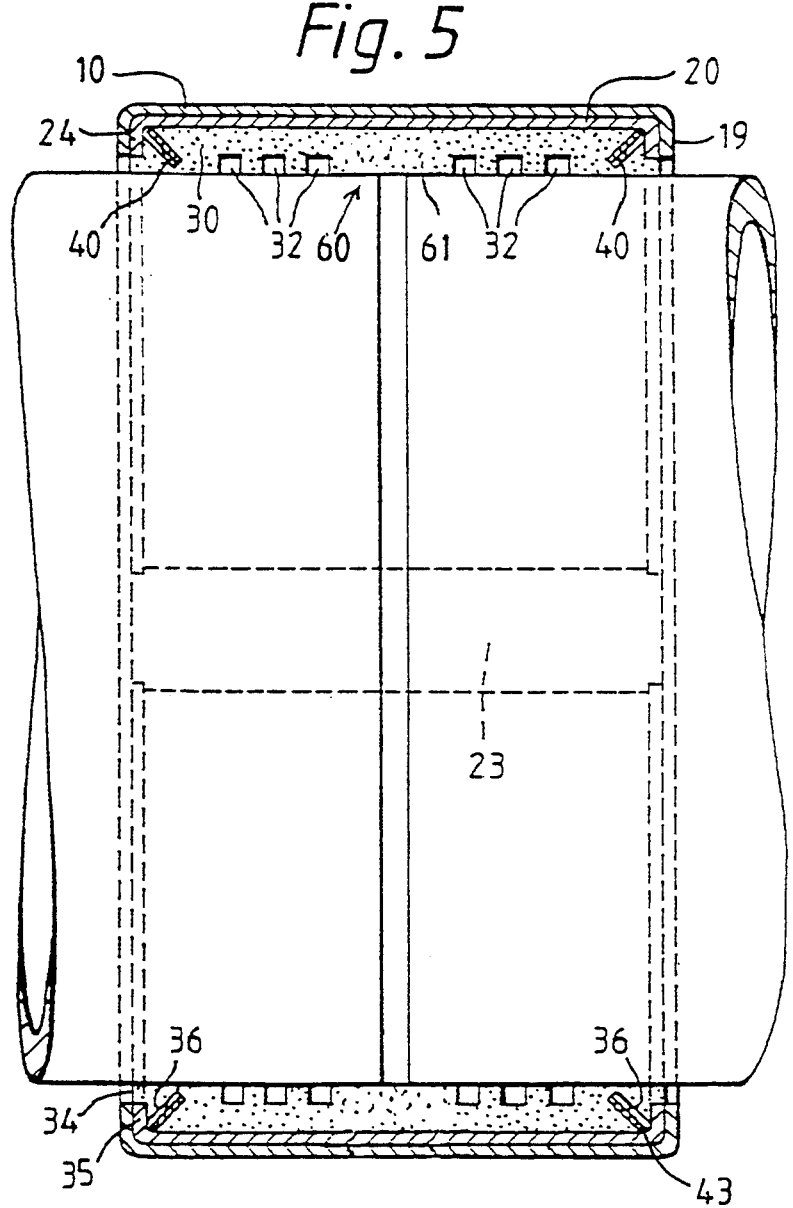

PIPE COUPLING

FIELD OF THE INVENTION

The present invention relates to pipe couplings for connecting together two plain-ended pipes in a fluid-tight manner, of the type consisting of a tubular casing formed with a longitudinal gap, a sealing sleeve of resilient flexible material arranged within the casing, and tensioning means for reducing the width of the longitudinal gap. In use, the sealing sleeve is placed around the adjacent pipe ends and the tensioning means are tightened to clamp the sleeve against the outer surfaces of the pipe ends to form a fluid tight seal.

BACKGROUND OF THE INVENTION

One known pipe coupling of this type is described in Uk-A-1,582,858. The sealing sleeve is of C-shaped longitudinal cross-section having two lips extending axially inwardly towards one another so as to form a groove between the extension and the web portion. When the casing is tightened around the pipe ends the lips of the sealing sleeve are pressed into sealing engagement with the outer surfaces of the pipe ends to form a seal. In use fluid carried by the pipes passes through the gap between the pipe ends into the space between the outside of the pipe end and the inside of the web portion of the sleeve. The fluid enters the grooves between the extensions of the lips causing the sealing pressure of the extensions against the pipes to increase as the pressure of the fluid increases. A disadvantage of such an arrangement is that substantially the whole of the inner surface of the web portion is exposed to the pressure of the fluid from the pipe. Where the fluid pressure is high, this can cause the casing to bulge out at its axial middle portion.

According to the present invention in a first aspect there is provided a pipe coupling for joining together two pipes in a fluid-tight manner, comprising a tubular sealing sleeve and tensioning means for tightening the casing around the sleeve, the sleeve including two sets of annular inwardly projecting sealing ribs on the inner surface of the sleeve which engage the respective pipe ends in a fluid tight manner.

With this arrangement only the portion of the sleeve between the axially innermost pair of ribs is exposed to the hydrostatic pressure of the fluid in the pipe. The casing is therefore less prone to bulging at high hydrostatic pressures and, in consequence, the casing can be made of lighter construction than a conventional coupling with the equivalent performance specification. This means that the coupling is less expensive and easier to handle during manufacture.

Joining together pipes with plain ends with couplings without the need for pipe preparation is quicker and more economical than other methods such as welding, screw threading, flanging, grooving or shouldering. However because of the enormous axial forces that may be involved in pipelines operating at pressures of say 16 bars, it is difficult to construct a coupling that can reliably withstand such forces.

In the coupling of GB-A-1582858, axial restraint is provided by two frustoconical rings with gripping teeth on their inner edges. The gripping rings are located at the sides of the sealing sleeve and held in position within the casing by means of snap rings. When the casing is tightened the gripping teeth bite into the pipe ends to provide axial restraint for the pipes.

There are a number of disadvantages with this arrangement. The gripping teeth are sharp and are exposed. This presents a hazard to the pipe fitters who might cut themselves when handling the couplings prior to fitting.

The teeth are exposed and may come into contact with water and other corrosive liquids depending on the enviroment in which they are employed. The teeth are usually made of a hard steel that is prone to crevice corrosion.

The geometry of the toothed gripping device is upset on clamping on to the pipe. The specially shaped snap rings that are required to support the gripping rings add to the complexity of the coupling and they only provide partial support for the gripping ring. The snap rings may act as fulcrums over which the teeth are bent when loaded and there is thus a potential for the teeth to snap off.

The geometry of the gripping ring is liable to be further upset if a C-shaped sealing sleeve is used for the reasons explained above. The bulging of the casing may cause the toothed gripping ring to be lifted out of contact with the pipe leading to failure.

Another type of known coupling is described in GB-A-2167145. This coupling, does not include toothed rings as described above, but it utilises annular sealing members arranged at either end of an annular sleeve, which has wedge-shaped ends. Two flange members fit at either end of the coupling, and a tensioning means is provided so that the flange members can be urged axially towards one another. This movement compresses the sealing members against the wedge-shaped ends of the sleeve, which in turn forces the sealing members radially inwardly to form a seal against the surface of the pipes.

A plurality of hard gripping members is embedded in each sealing member. Each gripping member has a tooth or teeth formed at one end, and is arranged in the sealing member so that the teeth are flush with, or adjacent, the inner surface of the sealing member. The gripping member is inclined at an angle relative to the axis of the coupling, and the axially outer end of each gripping member is arranged to be completely covered by, but closely adjacent, the outer surface of the sealing member near the corner in the flange member. As the coupling is tightened, the flange members move axially inwardly, compressing the sealing member, and urging the gripping members towards the pipes, causing them to bite into the surfaces of the pipes. Because of the axial displacement between the inner and outer ends of the gripping members, the gripping members will pivot as the sealing member is compressed.

In this coupling, the sealing action of the sealing member against the pipes' surfaces, and the biting action of the gripping members are not independent of each other. The gripping members and the sealing members are acted on simultaneously as the flanges are moved axially. Thus the gripping members and the sealing members restrict one another's movement. If the teeth of the gripping member bite the surface of the pipe before the sealing member is properly seated against the surface of the pipe, this could affect the sealing properties of the seal.

According to the present invention in a second aspect there is provided a pipe coupling for connecting together two pipes in a fluid-tight manner comprising of a tubular casing, a tubular sealing sleeve, and tensioning means for tightening the casing about the sealing sleeve, the sealing sleeve having a circumferential slot in its outer surface and a gripping ring with inwardly projecting gripping teeth located in the slot, the arrangement being such that, in use, tightening the tensioning means causes the sealing sleeve to be pressed into sealing engagement with the pipe ends and the gripping teeth to penetrate the bottom of the slot and to engage the outer surface of the pipe.

In a preferred form of the invention a slot with a gripping ring is provided at each end of the coupling. The slot may be frustoconical with the inner end nearer the axial middle of the coupling than the outer end. The gripping ring is also preferably frustoconical and preferably is an incomplete ring so that it can easily be expanded and compressed.

Preferably the casing has an inwardly projecting flange at each end and the gripping rings are located with their outer edges in the angles between the tubular portion of the casing and the flanges.

The tubular casing preferably comprises an inner casing and an outer casing. The inner casing fits within the outer casing. The inner casing and the outer casing both have longitudinal gaps and the gap in the inner casing is offset circumferentially from the gap in the outer casing so that the sealing sleeve is supported around its entire periphery either by the inner casing, or the outer casing, or both casings.

Both the inner and outer casing may have their axial end margins bent inwardly to form radial flanges.

By locating the gripping rings in slots in the outer surface of the sealing sleeve the gripping teeth are protected and will not injure the pipe fitter when being handled prior to use.

The sealing sleeve may be provided with end seals which form seals between the flanges and the pipe ends. In this way the ingress of water and other contaminants into the seal is prevented, and so the gripping rings are protected from corrosion.

Preferably the slot in the sleeve is wider than the thickness of the gripping rings so that the sealing sleeve does not interfere with the action of the gripping ring. The ring is only restrained by the angle of the inner and outer casings formed between their tubular walls and their annular flanges. The casing bears directly against the outer edge of the gripping ring. When the casing comprises an inner and an outer casing, as described hereinbefore, the inner casing bears against the gripping ring. This further reduces the tendency of the outer casing to bulge, compared with a single piece casing.

According to the present invention in a third aspect there is provided a pipe coupling for coupling together two pipes in a fluid-tight manner, comprising an outer tubular casing, an inner tubular casing located within the outer casing, a tubular sealing sleeve located within the inner casing and means for tensioning the outer casing around the inner casing and the sleeve, the inner and outer casings having inwardly directed end flanges, the tubular sealing sleeve being located between the end flanges of the inner and outer casing, the end flanges of the outer casing being adjacent the end flanges of the inner casing and providing lateral support therefor.

Preferably the coupling includes gripping means for securing the pipes axially, the gripping means being located axially inside the flanges of the inner casing. Preferably the gripping means are in the form of toothed rings. By locating all the components inside the inner and outer casings and their side flanges a strong and stable structure is achieved.

According to the present invention in a fourth aspect there is provided a pipe coupling for coupling together two pipes in a fluid tight manner, comprising an outer tubular casing, a tubular inner casing, a tubular sealing sleeve and means for tightening the outer casing around the inner casing and the sealing sleeve, the inner and outer casing including inwardly projecting end flanges, the sealing sleeve including end seals, so that in use, when the tensioning means are tightened, the sealing sleeve is urged into sealing contact with the outer surfaces of the pipe ends and the end seals form seals between the flanges and the outer surface of the pipe ends. Preferably the end seals are axial extensions of sealing sleeve which are trapped between the flanges and the pipes. The end seals prevent dirt, water or other contaminants entering between the flanges and the pipe and corroding components of the coupling or impairing the effectiveness of the seal.

In the preferred embodiment of the invention, in each aspect, the tensioning means applies a radially compressive force to the casing.

An embodiment of the invention will now be described, by way of example, with reference to the accompanying drawings, of which:

BRIEF DESCRIPTION OF THE DRAWINGS

FIG. 1 shows a perspective cut-away view of a coupling in accordance with the invention;

FIG. 2 shows an end view of the coupling of FIG. 1;

FIG. 3 shows a longitudinal section through the coupling of FIG. 1;

FIG. 4 shows a perspective view of gripping ring of the coupling of FIGS. 1 to 3; and FIG. 5 shows a longitudinal section through a coupling similar to the coupling of FIGS. 1 to 4 but with a modified sealing sleeve.

DETAILED DESCRIPTION

A pipe coupling 1 comprises an outer tubular casing 10 an inner tubular casing 20 and a sealing gasket 30. The outer tubular casing 10 is formed of rolled steel, with a longitudinal gap 13. The casing is folded back on itself at its free ends and welded at 14 to form loops 15 along opposite edges of the longitudinal gap 13. Pins 16 are inserted in the loops. Tensioning screws 17 pass through transverse holes in one of the pins 16 into tapped transverse holes in the other of the pins 16, so as to interconnect the two free ends of the outer casing. Slots 18 are cut in the loops 15 so as to provide clearance for the screws. The axial end margins of the casing 10 are bent inwardly at right angles to form radial flanges 19.

The inner tubular casing 20 is of rolled steel and has a longitudinal gap 23. The end margins of the casing 20 are bent inwardly at right angles to form radial flanges 24. The casing 20 fits inside the outer casing 10, the axial length of the casing 20 being slightly less than that of the casing 10 so that the flanges 24 fit inside and, in use, are supported laterally by the flanges 19.

The sealing gasket 30 is of rubber formed from a length of flat extrusion which is rolled into a tube and joined by welding to form a complete cylinder. Alternatively, the rubber casket may be moulded. The outer surface 31 of the gasket is smooth but the inner surface is formed with two sets of annular sealing ribs 32 which project inwardly and have a square profile. In the present embodiment there are three ribs in each set. Towards each end of the gasket the inner surface is stepped inwardly to form bands 33. The extreme ends of the gasket are formed by axial extensions of the inner part of the gasket, which form end seals 34.

The gasket 30 fits inside the inner casing with the side flanges 24 fitting into a recess 35 formed behind the end seals 34.

A frustoconical slot 36 is formed in the outer surface of the gasket at each end of the gasket. The outer end of each slot lies at the axial end of the outer surface, the inner end of the slot lies close to the inner surface of the band 33. The slope of the slot is such that the inner end is nearer the axial middle of the gasket than the outer end.

A gripping device in the form of a frustoconical ring 40 is located in the slot 36. The ring 40 is made of hard steel and is an incomplete ring having a gap 41 so that it can be fitted into the slot 36. The width of the slot is greater than the thickness of the steel sheet from which the ring is formed so that the sides of the slot do not interfere with the operation of the ring. The inner edge of the ring 40 is cut at intervals and the portions between cuts are distorted to form teeth 42. When the coupling is assembled the teeth sit in the bottom of the slot 36 and the outer edge 43 of the ring sits in the angle or corner formed by the flange 24 on the inner casing.

In use the ends of two plain ended pipes are inserted into the coupling from opposite ends as shown in FIG. 3. A space of say 10 mm may be left between the pipe ends to allow for angular deflection, or to avoid abrasive wear, or to dampen vibration. With the coupling in place, the screws 17 are tightened to clamp the coupling to the pipes. As the screws 17 are tightened, the loops 15 of the outer casing 10 are drawn together, thereby applying a radially compressive force to the outer casing. The inner casing is arranged so that its longitudinal gap 23 is diametrically opposite the longitudinal gap 13 in the outer casing. In this way the inner casing supports the gasket in the region of the gap 13 where there is no support from the outer casing. The inner casing is dimensioned so that when the coupling is tightened around the pipe ends, then only a small longitudinal gap 23 remains.

The tightening of the tensioning screws 17 presses the annular sealing ribs 32 into sealing contact with the outer surfaces of the pipe ends, the sealing ribs deforming easily due to their height, width and the grade of material used. At the same time, the gripping ring 40 is pushed inwardly by the angle of the inner casing gripping the outer edge of the ring. The compression of the gripping ring causes the edges of its teeth 42 to penetrate through the gasket 30 at the bottom of the slot 36 and bite into the surface of the pipe, thereby providing locking of the coupling to the pipe against axial movement. The teeth are designed to make contact at approximately 5 mm centres around the circumference with a width of approximately 2 mm for each tooth, giving approximately 40% contact around the periphery of the pipe.

The extensions 34 are trapped between the flanges 19 and 24 on the inner and outer casings and the outer surfaces of the pipe ends to form end seals. Thus liquid and dirt is prevented from entering the coupling from outside.

The coupling described has a number of advantages over known couplings. By using a series of ribs a seal is achieved which is effective at high hydrostatic pressures, for example 16 bars. However, the axial length (l) of the gasket that is exposed to the hydrostatic pressure is small compared with the overall length L of the coupling. This means that the tendency for the casing to bulge is less than with known couplings where almost the entire length of the gasket is exposed to the hydrostatic pressure of the fluid. As a result, the casing of the coupling of the present invention can be of lighter construction than an equivalent conventional coupling. For example, with a coupling for joining together two pipes of around 20 cm in diameter, (approximately 8 inches), the thickness of the outer casing can be approximately 3 mm, and the thickness of the inner casing approximately 2.5 mm. An advantage of using thinner metal is that the machinery required to form the casings is less expensive.

By locating the gripping ring in a slot in the outside of the gasket, the teeth are protected when the coupling is not in use and the coupling can be handled easily without a risk of the operator being cut. The resilience of the gripping ring and of the rubber of the gasket causes the teeth to retract back into the slot when the coupling is unfastened so that they no longer project through the inner surface of the gasket. The end seals keep out contamination which might enter the seals from outside and thereby affect performance. The use of low alloy, or high carbon, steel to produce hard teeth on the gripping ring renders them prone to corrosion. The end seals prevent the ingress of moisture, for example sea water, which could cause such corrosion.

The arrangement for holding the gripping rings is of simple construction and apart from the casings and the gasket, involves no separate parts. The entire structure is accommodated within the two pairs of annular flanges 19 and 24 which gives the total structure great strength and stability.

Because of the resilence in the gripping ring and the rubber, the clamping arrangement releases itself when the coupling is released.

The axial restraints operate independently of the gasket.

The teeth do not cut through the gasket entirely, they merely pierce it at 5 mm intervals and so the coupling can be repeatedly used.

Because the toothed ring is placed in a wide slot it is free to find its own settlement. The outer-edge is located in the angle between the flange and web portions of the inner casing, and the position of the inner edge is merely determined by the position where it bites into the pipe. As the coupling is tightened the teeth bite deeper into the pipe. The angle of approximately 45 degrees which is established between the ring and the pipe surface when the ring first bites is maintained as the coupling is tightened. The angle in the inner casing bears directly against the outer edge of the gripping ring.

Because the toothed ring bears against the angle in the inner casing, the reaction forces from the toothed ring can be spread through the surface of the inner casing to the outer casing. This further reduces the tendency of the casing to bulge, compared to a single piece casing.

Since in the preferred embodiment the seal is not of the C shaped type, it is not dependent on the hydrostatic pressure for effectiveness and therefore the structure is stable in both the charged and uncharged states. Likewise the axial gripping force is independent of the fluid pressure in the pipeline.

Although in the preferred embodiment the teeth are approximately 5 mm apart, and each tooth has a width of approximately 2 mm, the actual design of the spacing and width of each tooth will depend to some extent on the material from which the pipes are made. Different designs of the coupling can use alternative teeth spacings and teeth widths, depending on the hardness of the pipes for which the coupling is intended.

The sharpness of the teeth may also depend on the material of the pipes for which the coupling is intended. For example, in a coupling intended for joining pipes made of plastics material, the teeth may be blunt. In such an embodiment, as the casing is tightened around the joint, the teeth might not penetrate all of the way through the rubber gasket to bite into the surface of the pipes. In this case, the teeth can still exert sufficient force through the rubber gasket to grip the plastics pipes to axially restrain the coupling on the pipes.

Although the invention has been described in relation to a coupling for joining pipes of equal diameter it will be appreciated that it can be modified to form a stepped coupling of asymetric configuration for joining pipes of unequal diameter.

In such a stepped coupling the outer and inner casings would be constructed to extend deeper on the side of the smaller pipe. The gasket would be radially thicker on the side of the smaller pipe, and include a slot, as described above, into which a toothed ring could be fitted. In one form of construction of a stepped coupling, the radial thickness (i.e. the radial dimension from the outer periphery to the inner periphery) of the toothed ring on the side of the smaller pipe could be greater than that of the other toothed ring. Alternatively, the radial thickness of the toothed rings could be the same, the overall diameter of the ring on the side of the smaller pipe being less than that of the other ring. In this form of construction, the thickness of the inner casing would be increased, on the side of the smaller pipe, so that the respective toothed ring would bear against a portion of the inner casing.

Referring now to FIG. 5, this shows a coupling similar to the coupling of FIGS. 1 to 4 but with a modified sealing sleeve. In FIG. 5 the corresponding elements have the same reference numerals as FIGS. 1 to 4. The sealing sleeve 30 of FIG. 5 differs from that of FIG. 3 in that there is no cavity formed in the region 60 adjacent the ends of the pipes, between the web portion of the sleeve 30 the ribs 32 and the outsides of the pipe ends. Instead the web portion extends inwardly to form an annular land 61 which is pressed against the outside of the pipe ends when the coupling is tightened around the pipes to form a seal.

The absence of the cavity does not impair the sealing qualities of the coupling and allows the coupling to be used in sanitary applications such as food and chemical processing where the presence of a cavity as in FIG. 3 would preclude the use of the coupling because the fluid passing through the coupling would accumulate in the cavity and could not be cleared out easily by flushing. Typically the width of the land 61 would be 25 to 45 mm.

We claim:

1. A pipe coupling for connecting together two pipes in a fluid-tight manner, the coupling comprising:
   a tubular casing concentrically surrounding mutually opposing end portions of the pipes:
   a tubular sealing sleeve disposed radially between the pipes and the tubular casing, the sealing sleeve having at least one circumferential slot disposed in a radially outer surface thereof;
   tensioning means for tightening the tubular casing about the sealing sleeve; and
   gripping ring means for preventing the pipes from being pushed apart axially when subjected to large internal pressures, the gripping ring means being positioned within the at least one slot and having a plurality of radially inwardly projecting gripping teeth whereby tightening the tensioning means causes the sealing sleeve to be pressed into sealing engagement with the pipe ends, and causes the gripping teeth to penetrate through a radially inner surface portion of the sealing sleeve which is disposed radially inwardly from an inner end of the at least one slot to engage a radially outer surface of one of the pipes.

2. A coupling according to claim 1, wherein a slot with a gripping ring means disposed therein is provided at each axial end of the coupling.

3. A coupling according to claim 2, wherein the casing includes a flange extending radially inwardly from each axial end of the casing, each flange cooperating with the casing to define a respective corner portion where the flange is joined to the casing, each gripping ring means having a radially outer end abutting a respective corner portion.

4. A coupling according to claim 2, wherein each slot in the sleeve is wider than the gripping ring means disposed therein.

5. A coupling according to claim 1, wherein the slot is frustoconical and extends radially and axially inwardly toward an axial middle of the coupling.

6. A coupling according to claim 5, wherein the gripping ring means is frustoconical.

7. A coupling according to claim 1, wherein the gripping ring means is circumferentially incomplete.

8. A coupling according to claim 1, wherein the tubular casing includes an inner casing member, and an outer casing member concentrically surrounding the inner casing member.

9. A coupling according to claim 8, wherein the inner casing member and the outer casing member each have a circumferential gap, the gap in the inner casing member being offset circumferentially from the gap in the outer casing member so that the sealing sleeve is supported around its entire periphery by the combination of both casing members.

10. A coupling according to claim 8, wherein each of the inner and outer casing members have their respective axial end margins bent radially inwardly to form radial flanges.

11. A coupling according to claim 10, wherein the sealing sleeve includes end seals positioned between the respective radial flanges and the pipe end at each axial end of the sealing sleeve, the end seals forming seals between the respective radial flanges and the outer surfaces of the pipe ends when the casing is tightened.

12. A pipe coupling for coupling together two pipes in a fluid-tight manner, comprising:
   an outer tubular casing;
   an inner tubular casing located concentrically within the outer tubular casing;
   a tubular sealing sleeve located concentrically within the inner casing and surrounding mutually opposing end portions of the pipes;
   means for tensioning the outer casing around the inner casing and the sleeve; and
   the inner and outer casings each having radially inwardly directed and axially-spaced apart end flanges, the tubular sealing sleeve being located between the end flanges of the inner casing, and the end flanges of the outer casing being axially outwardly adjacent the end flanges of the inner casing and providing lateral support therefor.

13. A coupling according the claim 12, further including gripping means for securing the pipes axially, the gripping means being located axially inwardly from each of the flanges of the inner casing.

14. A coupling according to claim 13, wherein the gripping means include toothed rings.

15. A coupling according to claim 12, wherein the inner and outer casings each have a circumferential gap therein, the gap in the inner casing being offset circumferentially from the gap in the outer casing so that the sealing sleeve is supported around its periphery by the combination of both casings.

16. A pipe coupling for coupling together two pipes in a fluid-tight manner, comprising:
an outer tubular casing;
an inner tubular casing located concentrically within the outer tubular casing;
a tubular sealing sleeve located concentrically within the inner tubular casing and surrounding mutually opposing ends of the pipes;
means for tightening the outer casing around the inner casing and sealing sleeve; and
the inner and outer casings each including radially inwardly projecting and axially-spaced apart end flanges, the sealing sleeve including end seals located between the respective flanges and radially outer surfaces of the pipe ends so that when the tensioning means are tightened, the sealing sleeve is urged into sealing contact with the outer surfaces of the pipe ends and the end seals form seals between the respective flanges and the outer surfaces of the pipe ends.

17. A coupling according to claim 16, wherein the end seals are axial extensions of the sealing sleeve which are confined between the respective flanges and the pipe ends.

18. A pipe coupling for joining together two pipes in a fluid-tight manner, comprising:
a tubular casing;
a tubular sealing sleeve concentrically disposed within the casing and surrounding mutually opposing ends of the pipes;
tensioning means for tightening the casing around the sleeve; and
the sleeve including two sets of annular radially inwardly projecting sealing ribs on an inner surface of the sleeve which engage the respective pipe ends in a fluid-tight manner, the sealing ribs each being of substantially square profile, the internal diameter of which is equal to the minimum internal diameter of said sealing sleeve, an axially innermost rib of each set being located adjacent the end of the corresponding pipe whereby a portion of the sealing sleeve that is exposed to hydrostatic pressure in the pipes is small compared with the overall length of the sealing sleeve.

19. A pipe coupling according to claim 18, wherein said tubular sealing sleeve includes a central annular radially inwardly projecting sealing land, the internal diameter of which is equal to said internal diameter of said sealing ribs, which overlaps the ends of the pipes and forms a seal against radially outer surfaces of the pipes.

* * * * *